United States Patent
Tsirkin et al.

(10) Patent No.: US 10,346,330 B2
(45) Date of Patent: Jul. 9, 2019

(54) UPDATING VIRTUAL MACHINE MEMORY BY INTERRUPT HANDLER

(71) Applicant: Red Hat Israel, Ltd., Raanana (IL)

(72) Inventors: Michael Tsirkin, Yokeneam Yillit (IL); Henri Han van Riel, Westford, MA (US)

(73) Assignee: Red Hat Israel, Ltd., Raanana (IL)

( * ) Notice: Subject to any disclaimer, the term of this patent is extended or adjusted under 35 U.S.C. 154(b) by 574 days.

(21) Appl. No.: 14/167,497

(22) Filed: Jan. 29, 2014

(65) Prior Publication Data

US 2015/0212956 A1 Jul. 30, 2015

(51) Int. Cl.
*G06F 13/34* (2006.01)
*G06F 9/48* (2006.01)
*G06F 9/50* (2006.01)

(52) U.S. Cl.
CPC .......... *G06F 13/34* (2013.01); *G06F 9/4812* (2013.01); *G06F 9/5027* (2013.01); *G06F 9/5077* (2013.01); *G06F 2213/2424* (2013.01)

(58) Field of Classification Search
CPC .................................................. G06F 9/45533
See application file for complete search history.

(56) References Cited

U.S. PATENT DOCUMENTS

| | | | | |
|---|---|---|---|---|
| 4,520,441 A | * | 5/1985 | Bandoh | G06F 12/0866 711/203 |
| 6,049,851 A | * | 4/2000 | Bryg | G06F 12/0831 711/141 |
| 7,665,088 B1 | * | 2/2010 | Bugnion | G06F 9/45533 710/200 |
| 8,032,897 B2 | | 10/2011 | Serebrin | |
| 8,352,670 B2 | | 1/2013 | Serebrin | |
| 8,402,441 B2 | | 3/2013 | Budko et al. | |
| 9,319,490 B2 | * | 4/2016 | Zhou | H04L 69/166 |
| 2007/0055843 A1 | * | 3/2007 | Lameter | G06F 12/08 711/206 |
| 2012/0117301 A1 | | 5/2012 | Wingard | |
| 2012/0167082 A1 | | 6/2012 | Kumar et al. | |
| 2013/0042242 A1 | * | 2/2013 | Kagan | G06F 9/45558 718/1 |
| 2013/0155083 A1 | | 6/2013 | McKenzie et al. | |

OTHER PUBLICATIONS

Paul Barham, et al. "Xen and the Art of Virtualization", University of Cambridge Computer Laboratory; Microsoft Research, Cambridge, UK; Intel Research, Cambridge, UK, Oct. 19-22, 2003 http://www.gta.ufrj.br/ensino/CPE758/artigos-basicos/Xen-art.pdf.

(Continued)

*Primary Examiner* — Henry Tsai
(74) *Attorney, Agent, or Firm* — Lowenstein Sandler LLP (57) ABSTRACT

Systems and methods for directly updating the virtual machine memory by interrupt handlers. An example method may comprise: receiving, by a computer system, an interrupt triggered by a physical device; receiving, by an interrupt handling routine, a data frame from the physical device; identifying a virtual machine to receive the interrupt; and responsive to determining that an active memory context on the computer system matches a memory context of the virtual machine, writing, by the interrupt handling routine, the data frame into a memory of the virtual machine.

20 Claims, 4 Drawing Sheets

(56) References Cited

OTHER PUBLICATIONS

Bill Weinberg, "Device Driver Paravirtualization: VM Heaven or It Hell?", Oct. 26, 2007 http://searchservervirtualization.techtarget.com/tip/Device-driver-paravirtualization-VM-heaven-or-IT-hell.
"How Tuning the Kernel" http://www.linux-kvm.org/page/Tuning_Kernel, last accessed Dec. 27, 2013.
Tsirkin, Michael S., "[PATCH v3 11/11] Kernel: Uaccess in Atomic With Pagefault_Disable", LKML.org, May 23, 2013, 2 pages https://lkml.org/lkml/2013/5/24/262.

* cited by examiner

UPDATING VIRTUAL MACHINE MEMORY BY INTERRUPT HANDLER

TECHNICAL FIELD

The present disclosure is generally related to virtualized computer systems, and is more specifically related to systems and methods for directly updating the virtual machine memory by interrupt handlers.

BACKGROUND

Virtualization herein shall refer to abstraction of some physical components into logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines in order to improve the hardware utilization rate. Virtualization may be achieved by running a software layer, often referred to as "hypervisor," above the hardware and below the virtual machines. A hypervisor may run directly on the server hardware without an operating system beneath it or as an application running under a traditional operating system. A hypervisor may abstract the physical layer and present this abstraction to virtual machines to use, by providing interfaces between the underlying hardware and virtual devices of virtual machines. Processor virtualization may be implemented by the hypervisor scheduling time slots on one or more physical processors for a virtual machine, rather than a virtual machine actually having a dedicated physical processor. Memory virtualization may be implemented by employing a page table (PT) which is a memory structure translating virtual memory addresses to physical memory addresses. Device and input/output (I/O) virtualization involves managing the routing of I/O requests between virtual devices and the shared physical hardware. In certain implementations, the hypervisor may virtualize the physical hardware by presenting a virtual machine with one or more virtual devices emulating corresponding physical devices.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Described herein are methods and systems for directly updating the virtual machine memory by interrupt handlers, in order to improve the interrupt processing latency.

"Paravirtualization" herein shall refer to a virtualization technique that presents to virtual machines an interface that is similar but not identical to that of the underlying hardware, with the purpose of improving the overall system performance, e.g., by moving to the user space some operations that in the absence of paravirtualization would have to be performed in the kernel space. A paravirtualized I/O device driver (e.g., a disk or a network interface card driver) may interact with the host computer system directly, thus allowing the disk and network subsystems to operate at near native speeds even in a virtualized environment.

In an illustrative example, a virtual machine may comprise one or more virtual Ethernet interfaces which may transmit and/or receive Ethernet frames to/from other virtual machines running on the same host computer systems and/or other host computer systems. In another illustrative example, a virtual machine may comprise one or more virtual block devices which may facilitate the data interchange with one or more physical disks.

The host computer system may process interrupts generated by the physical devices and route the I/O requests between virtual devices and the corresponding physical devices. "Interrupt" herein shall refer to an event that requires a processor to execute event-specific instructions, which might involve suspending the current thread of execution and/or switching contexts by the processor. Interrupts may be processed by one or more interrupt controllers such as Advanced Programmable Interrupt Controllers (APICs), including one local APIC per processor and one or more input/output (I/O) APICs connected to I/O devices.

In certain implementations, the host computer system, responsive to receiving an interrupt from a network interface card (NIC), may invoke an interrupt handler routine to receive an incoming data frame from the NIC, and then wake up an I/O thread associated with a paravirtualized NIC to which the data frame is addressed. The I/O thread may attempt to write the data frame into a virtual machine memory buffer. If the corresponding virtual memory page is not present in the host memory, a page fault may be triggered, and the I/O thread may be blocked until the memory page is swapped in by the page fault handler. When the memory page is swapped in, the I/O thread may copy the data frame into the virtual machine memory buffer, and notify the virtual machine of the incoming data frame.

The ability of an I/O thread to be blocked on a page fault relied upon by the above described example allows memory over-commitment but increases the interrupt processing latency. In accordance with one or more aspects of the present disclosure, the interrupt processing latency may be reduced by updating the virtual machine memory directly by the interrupt handler, without invoking an additional I/O thread, as described in more details herein below.

In an illustrative example, the host computer system may receive an interrupt from a network interface card (NIC) or a block I/O device (e.g., a disk) and invoke an interrupt handler routine to receive an incoming data frame from the NIC or the block I/O device. Then, instead of awakening an I/O thread that would write the data frame to the memory of the virtual machine which owns the paravirtualized NIC or paravirtualized block I/O device to which the interrupt has been addressed, the host computer system may ascertain whether the active host memory context matches the virtual machine context. If the contexts match, the host may attempt to write the incoming data frame into the virtual machine memory. Responsive to determining that no page fault has been caused by the attempted write operation, the host may complete the write operation and notify the virtual machine of the incoming data frame, as described in more details herein below.

Should the active context not match that of the virtual machine, or should the memory page be not present in the memory and thus trigger a page fault, the host may queue the incoming data frame for processing by an I/O thread associated with the paravirtualized NIC or paravirtualized I/O block device.

Various aspects of the above referenced methods and systems are described in details herein below by way of examples, rather than by way of limitation.

Figure 1:
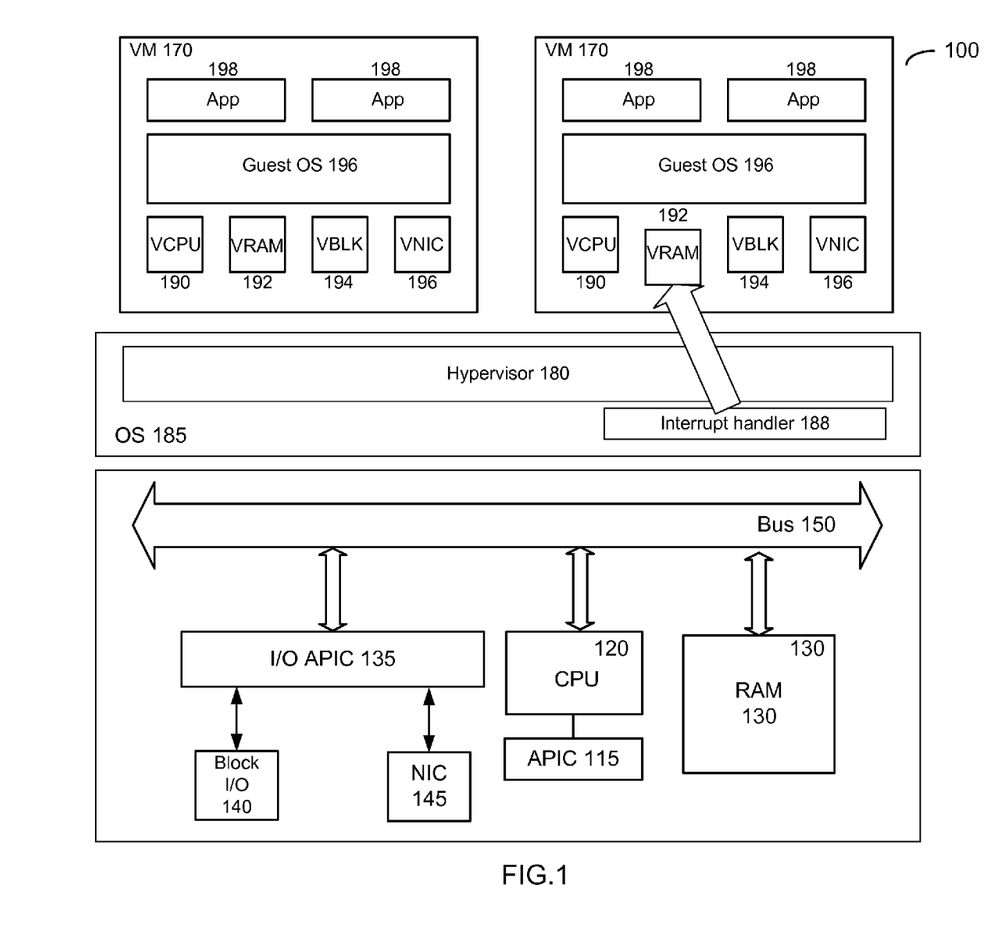
FIG. 1 depicts a high-level component diagram of an example host computer system, in accordance with one or more aspects of the present disclosure.

FIG. 1 depicts a high-level component diagram of an illustrative example of a computer system 100 in accordance with one or more aspects of the present disclosure. Computer system 100 may include one or more processors 120 communicatively coupled to memory devices 130 and input/output (I/O) devices 140, 145 via a system bus 150.

"Processor" herein refers to a device capable of executing instructions encoding arithmetic, logical, or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU). "Memory device" herein refers to a volatile or non-volatile memory device, such as RAM, ROM, EEPROM, or any other device capable of storing data. "I/O device" herein refers to a device capable of providing an interface between a processor and an external device capable of inputting and/or outputting binary data. In an illustrative example, an I/O device may be provided by a network interface controller (NIC) 145 or a block I/O device, such as disk 140.

Computer system 100 may further comprise one or more Advanced Programmable Interrupt Controllers (APIC), including one local APIC 115 per processor and one or more I/O APICs 135. Local APIC 115 may receive interrupts from local sources (including timer interrupts, internal error interrupts, performance monitoring counter interrupts, thermal sensor interrupts, and I/O devices connected to the processor's local interrupt pins either directly or via an external interrupt controller) and externally connected I/O devices (i.e., I/O devices connected to an I/O APIC), as well as inter-processor interrupts (IPIs).

Computer system 100 may run multiple virtual machines 170, by executing a software layer 180, often referred to as "hypervisor," above the hardware and below the virtual machines, as schematically illustrated by FIG. 1. In one illustrative example, the hypervisor 180 may be a component of the operating system 185 executed by the host computer system 100. Alternatively, the hypervisor 180 may be provided by an application running under the host operating system 185, or may run directly on the host computer system 100 without an operating system beneath it. The hypervisor 180 may abstract the physical layer, including processors, memory, and I/O devices, and present this abstraction to virtual machines 170 as virtual devices. A virtual machine 170 may execute a guest operating system 196 which may utilize the underlying virtual processors 190, virtual memory 192, and virtual I/O devices 194, 196. One or more applications 198 may be running on a virtual machine 170 under the guest operating system 196.

The address space virtualization may be implemented by the paging mechanism designed to support a virtual memory environment where a virtual machine address space is simulated with a smaller amount of random access memory (RAM) and a backing store (e.g., a disk). The memory may be divided into pages of a defined size (e.g., 4 KB) which may be stored on a virtual disk exposed to the virtual machine and accessible via a network. The guest operating system may maintain a page directory and a set of page tables to keep track of the pages. When a virtual machine attempts to access a memory page, it may use the page directory and page tables to translate the virtual address into a physical address. If the page being accessed is not currently in the physical memory, a page-fault exception may be generated, responsive to which the virtual machine may read the page from the virtual disk and continue executing the thread.

I/O device virtualization may be implemented by providing one or more paravirtualized I/O devices. In an illustrative example, virtual NIC 196 may be provided by a paravirtualized NIC driver. In another illustrative example, virtual I/O block device 194 may be provided by a paravirtualized disk driver. In certain implementations, the paravirtualized devices 194, 196 may be compliant with virtio-blk and virtio-net virtualization interfaces, respectively.

In accordance with one or more aspects of the present disclosure, computer system 100 may comprise an interrupt handler 188 programmed to process interrupts triggered by I/O devices (e.g., NICs and/or block devices) by performing direct updates of the virtual machine memory, without invoking additional I/O threads associated with the virtual machine, in order to reduce the interrupt processing latency.

Figure 2:
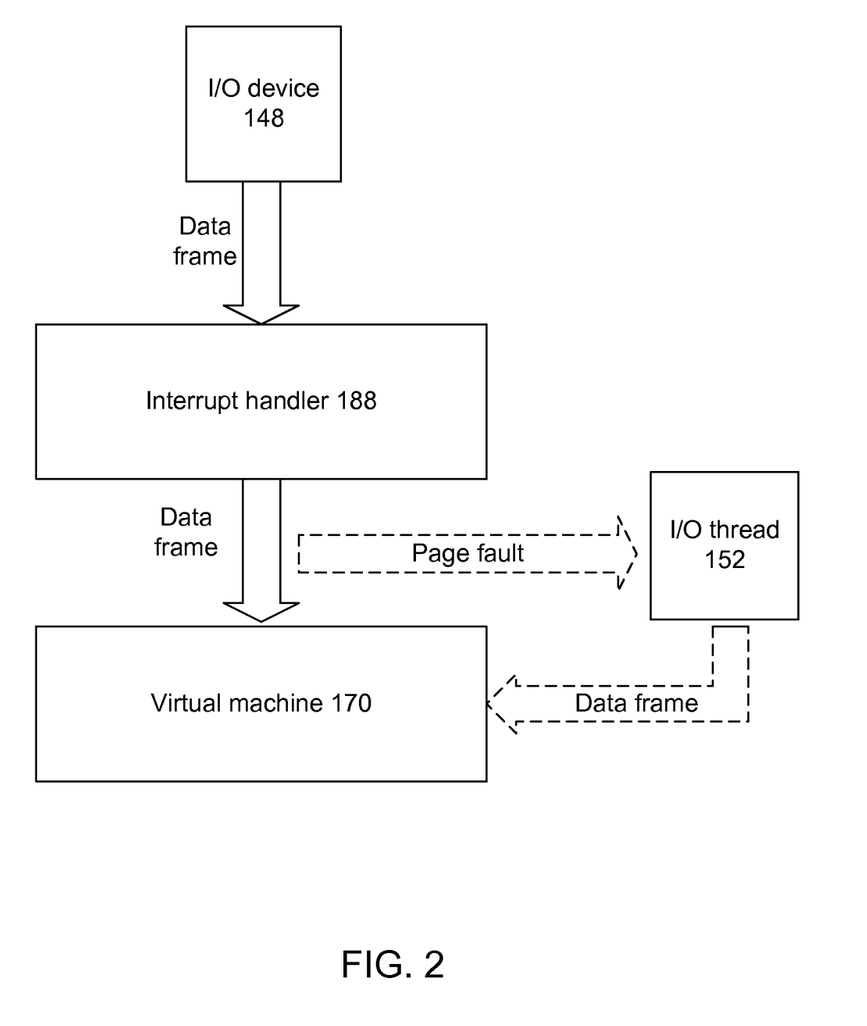
FIG. 2 schematically illustrates an example interrupt handling sequence, in accordance with one or more aspects of the present disclosure.

In an illustrative example of FIG. 2, the host computer system may receive an interrupt from an I/O device 148. The latter may be provided by a network interface card (NIC) or a block I/O device (e.g., a disk). Responsive to receiving the interrupt, the host computer system may invoke interrupt handler routine 188 which may receive an incoming data frame from I/O device 148. The host computer system may then identify the paravirtualized I/O device to which the interrupt has been addressed (e.g., based on the destination MAC address field of the incoming Ethernet frame) and determine whether the current memory context of the host computer system matches the memory context of the virtual machine that owns the identified paravirtualized I/O device. The memory context may comprise the page table and other data used to translate virtual to physical addresses.

Responsive to determining that the current memory context of the host computer system matches the memory context of the virtual machine that owns the identified paravirtualized I/O device, the host computer system may disable page fault handling by the virtual memory manager, so that a page fault triggered by an attempted access to a memory page which is not present in the physical memory would not be resolved by swapping the memory page in the physical memory, but would rather result in an error condition detectable by the host computer system.

Upon disabling page fault handling, the host computer system may attempt to write the incoming data frame directly into the memory of a virtual machine 170 associated with the paravirtualized I/O device 148 to which the interrupt has been addressed. Writing the data frame directly into the virtual machine memory by the host interrupt handler without invoking an I/O thread 152 associated with the virtual machine may significantly reduce the interrupt processing latency.

Responsive to determining that no page fault has been caused by the attempted write operation, the host computer system may re-enable the page fault handling (if it was previously in the enabled state) and complete the write operation. Upon completing the write operation, the host computer system may notify the virtual machine of the incoming data frame (e.g., by injecting an interrupt into a virtual processor associated with the virtual machine).

The attempt to directly write the incoming data frame into the virtual machine memory by the host interrupt handler may fail due to the active host context at the time of the interrupt not matching the virtual machine context, or due to the virtual memory page to which the data frame should be written not being present in the physical memory. If any of these conditions occurs, the interrupt handler may complete the interrupt processing by queuing the incoming data frame for processing by an I/O thread associated with the paravirtualized NIC or paravirtualized I/O block device.

Figure 3:
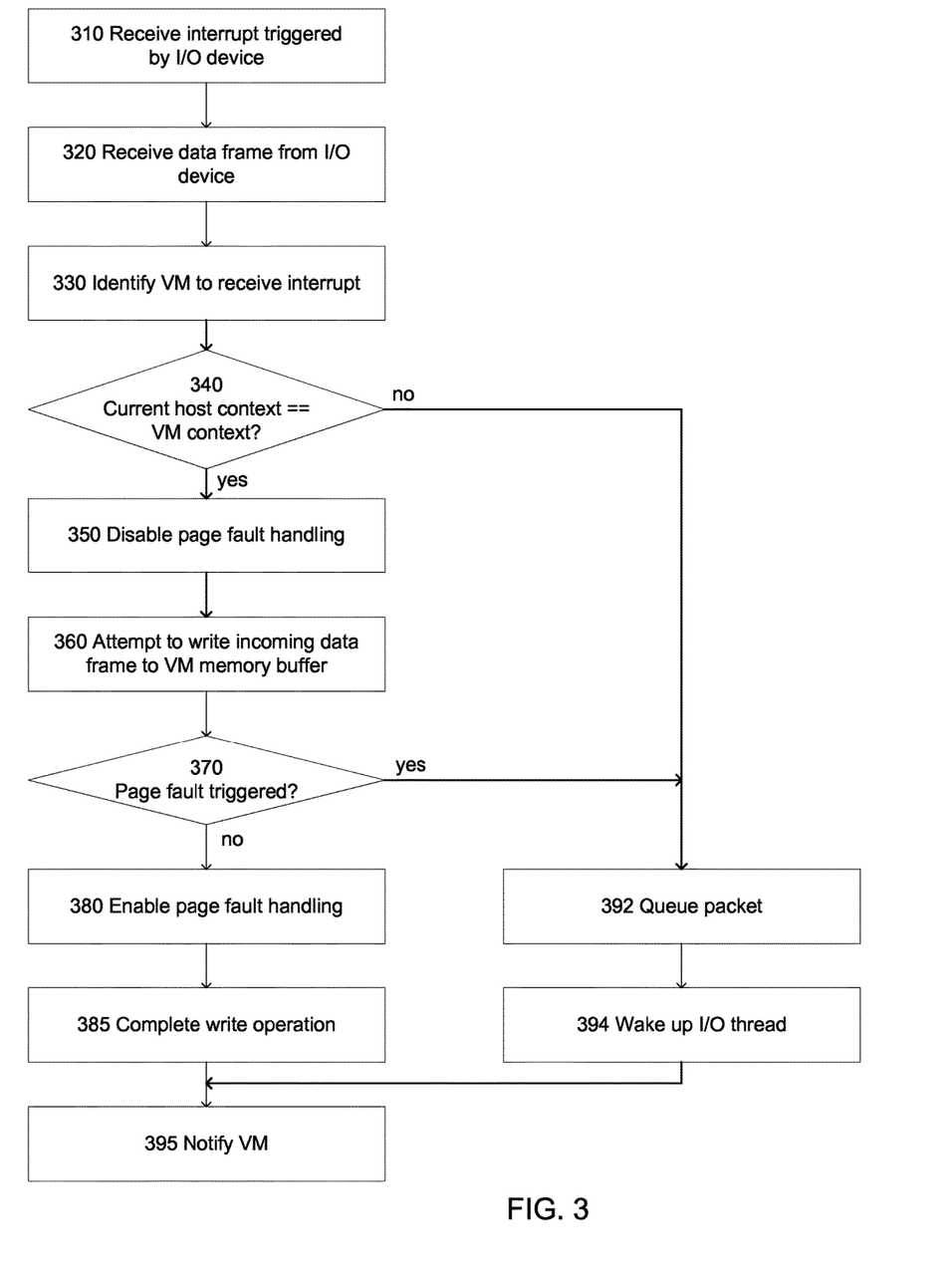
FIG. 3 depicts a flow diagram of a method for directly updating the virtual machine memory by interrupt handlers, in accordance with one or more aspects of the present disclosure.

FIG. 3 depicts a flow diagram of an example method 300 for directly updating the virtual machine memory by an interrupt handler. Method 300 may be performed by a computer system that may comprise hardware (e.g., circuitry, dedicated logic, and/or programmable logic), software (e.g., instructions executable on a computer system to perform hardware simulation), or a combination thereof. Method 300 and/or each of its individual functions, routines, subroutines, or operations may be performed by one or more processors of the computer system executing the method (e.g., computer system 100 of FIG. 1). In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processing threads implementing method 300 may be executed asynchronously with respect to each other.

At block 310, a host computer system may receive an interrupt from an I/O device. In illustrative examples, the I/O device may be provided by a network interface card (NIC) or a block I/O device (e.g., a disk).

Responsive to receiving the interrupt, the host computer system may invoke an interrupt handler routine which may, at block 320, receive an incoming data frame from the I/O device (e.g., by reading the data frame from one or more I/O ports or from a designated memory address range).

At block 330, the interrupt handler routine may identify a virtual machine to process the interrupt. In an illustrative example, the virtual machine to process the interrupt may be identified as the virtual machine that owns the virtual I/O device to which the interrupt has been addressed (e.g., based on the destination MAC address field of the incoming Ethernet frame).

At block 340, interrupt handler routine may ascertain that the current memory context of the host computer system matches the memory context of the virtual machine identified at block 330. The memory context may comprise the page table and other data used to translate virtual to physical addresses.

At block 350, the interrupt handler routine may disable page fault handling by the virtual memory manager, so that a page fault triggered by an attempted access to a memory page which is not present in the physical memory would not be resolved by swapping the memory page in the physical memory, but would rather result in an error condition detectable by the host computer system.

At block 360, the interrupt handler routine may attempt to write the incoming data frame directly into the memory of the virtual machine identified at block 330.

Responsive to determining, at block 370, that no page fault has been caused by the attempted write operation, the interrupt handler routine, at block 380, re-enable the page fault handling (if it was previously in the enabled state) and, at block 385, complete the write operation. Upon completing the write operation, the interrupt handler routine may notify, at block 395, the virtual machine of the incoming data frame (e.g., by injecting an interrupt into a virtual processor associated with the virtual machine).

The attempt to directly write the incoming data frame into the virtual machine memory by the host interrupt handler may fail due to the active host context at the time of the interrupt not matching the virtual machine context, as determined at block 360, or due to the virtual memory page to which the data frame should be written not being present in the physical memory, as determined at block 370. If any of these conditions occurs, the interrupt handler may complete the interrupt processing by queuing, at block 392, the incoming data frame for processing by an I/O thread associated with the paravirtualized NIC or paravirtualized I/O block device, and waking up the I/O thread, at block 394. Upon completing the operations schematically described by block 395, the method may terminate.

Figure 4:
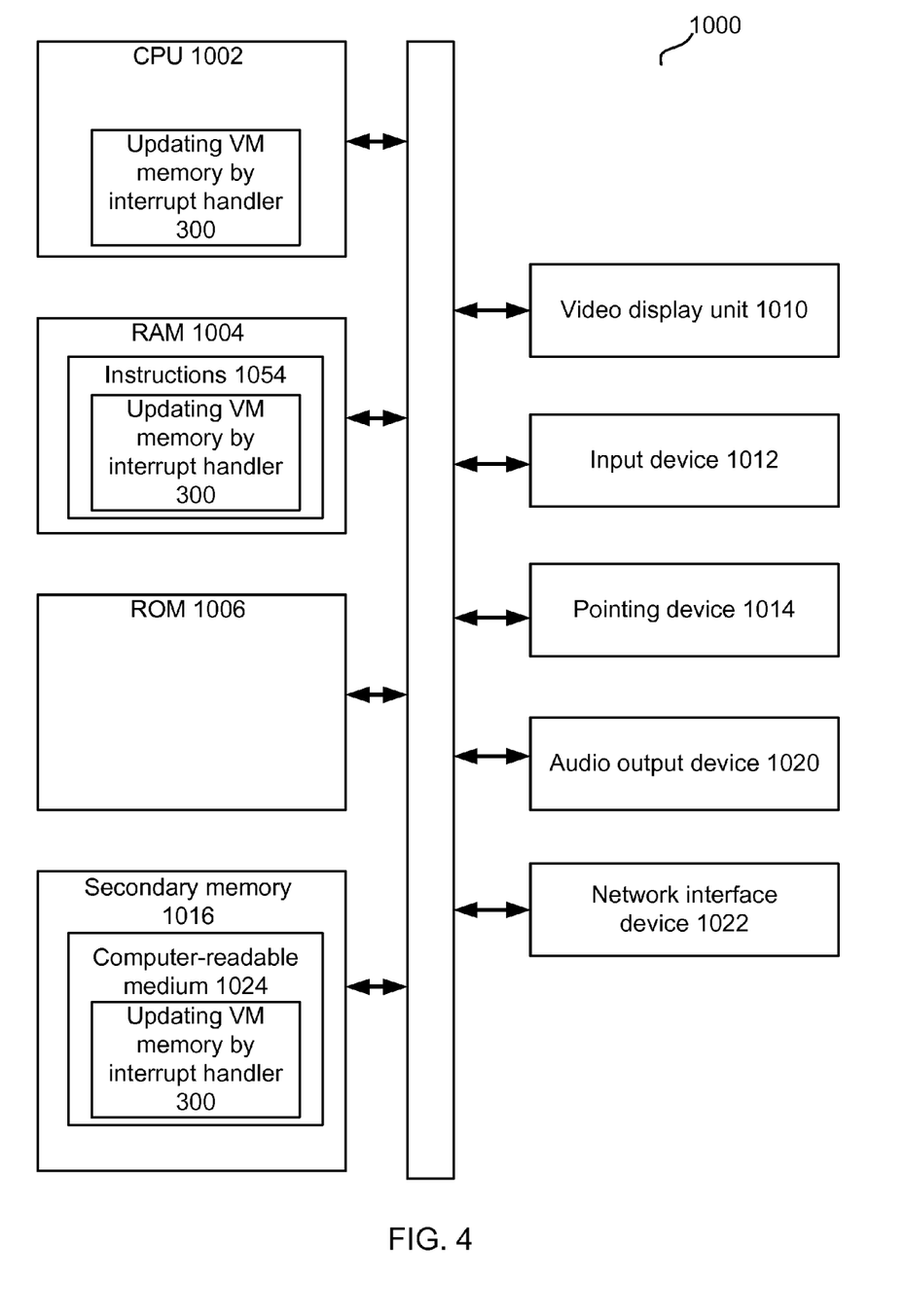
FIG. 4 depicts a block diagram of an illustrative computer system operating in accordance with examples of the invention.

FIG. 4 depicts an example computer system 1000 within which a set of instructions, for causing the computer system to perform any one or more of the methods described herein, may be executed. In certain implementations, computer system 1000 may correspond to computer system 100 of FIG. 1.

In one example, computer system 1000 may be connected (e.g., via a network, such as a Local Area Network (LAN), an intranet, an extranet, or the Internet) to other computer systems. Computer system 1000 may operate in the capacity of a server or a client computer in a client-server environment, or as a peer computer in a peer-to-peer or distributed network environment. Computer system 1000 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, computer system 1000 may comprise a physical processor 1002, a volatile memory 1004 (e.g., random access memory (RAM)), a non-volatile memory 1006 (e.g., read-only memory (ROM) or electrically-erasable programmable ROM (EEPROM)), and a secondary memory 1016 (e.g., a data storage device), which may communicate with each other via a bus 1008.

Processor 1002 may be provided by one or more physical processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 1000 may further comprise a network interface device 1022. Computer system 1000 also may comprise a video display unit 1010 (e.g., an LCD), an alphanumeric input device 1012 (e.g., a keyboard), a pointing device 1014 (e.g., a mouse), and an audio output device 1020 (e.g., a speaker).

Secondary memory 1016 may comprise a non-transitory computer-readable storage medium 1024 on which may be stored instructions implementing method 300 for directly updating the virtual machine memory by interrupt handlers. Instructions of method 300 may also reside, completely or partially, within the main memory 1004 and/or within processor 1002 during execution thereof by computer system 1000, hence, main memory 1004 and processor 1002 may also constitute machine-readable storage media.

While computer-readable storage medium 1024 is shown in the illustrative embodiment as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any non-transitory medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

Unless specifically stated otherwise, terms such as "updating", "identifying", "determining", "sending", "assigning", or the like, refer to actions and processes performed or implemented by computer systems that manipulates and transforms data represented as physical (electronic) quantities within the computer system's registers and memories into other data similarly represented as physical quantities within the computer system memories or registers or other such information storage, transmission or display devices.

Embodiments described herein also relate to an apparatus for performing the methods described herein. This apparatus may be specially constructed for the required purposes, or it may comprise a general purpose computer system selectively programmed by a computer program stored in the computer system. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples and embodiments, it will be recognized that the present disclosure is not limited to the embodiments described. The scope of the disclosure should be determined with reference to the following claims, along with the full scope of equivalents to which the claims are entitled.

What is claimed is:

1. A method, comprising:
   receiving, by a processor of a host computer system, an interrupt triggered by a physical device;
   receiving, by an interrupt handling routine, a data frame from the physical device;
   identifying, by the processor, a paravirtualized input/output (I/O) device to receive the interrupt;
   responsive to determining that an active memory context associated with the processor matches a memory context of a virtual machine associated with the paravirtualized I/O device, writing the data frame into a memory of the virtual machine; and
   responsive to determining that a page fault has been triggered by the writing operation, queuing the data frame for processing by an I/O processing thread and waking up the I/O processing thread.

2. The method of claim 1, wherein the physical device is provided by one of: a network interface card or a hard disk controller.

3. The method of claim 1, further comprising:
   enabling page fault handling by the host computer system responsive to determining that no page fault has been triggered by the write operation.

4. The method of claim 1, further comprising:
   responsive to determining that the active memory context associated with the processor does not match the memory context of the virtual machine, queuing the data frame for processing by the I/O processing thread.

5. A system comprising:
   a memory; and
   a processor, operatively coupled to the memory, to:
   receive an interrupt triggered by a physical device;
   receive, by an interrupt handling routine, a data frame from the physical device;
   identify a paravirtualized input/output (I/O) device to receive the interrupt;
   responsive to determining that an active memory context associated with the processor matches a memory context of a virtual machine associated with the paravirtualized I/O device, disable page fault handling by the virtual machine and write the data frame into a memory of the virtual machine; and
   responsive to determining that the active memory context associated with the processor does not match the memory context of the virtual machine, queue the data frame for processing by an I/O processing thread and wake up the I/O processing thread.

6. The system of claim 5, wherein the physical device is provided by one of: a network interface card or a hard disk controller.

7. The system of claim 5, wherein the processor is further to:
   enable page fault handling by the virtual machine responsive to determining that no page fault has been triggered by the write operation.

8. A computer-readable non-transitory storage medium comprising executable instructions that, when executed by a processor, cause the processor to:

receive, by the processor, an interrupt triggered by a physical device;

receive, by an interrupt handling routine, a data frame from the physical device;

identify, by the processor, a paravirtualized input/output (I/O) device to receive the interrupt;

responsive to determining that an active memory context associated with the processor matches a memory context of a virtual machine associated with the paravirtualized I/O device, write the data frame into a memory of the virtual machine; and responsive to determining that a page fault has been triggered by the writing operation, queue the data frame for processing by an I/O processing thread and wake up the I/O processing thread.

9. The computer-readable non-transitory storage medium of claim 8, wherein the physical device is provided by one of: a network interface card or a hard disk controller.

10. The computer-readable non-transitory storage medium of claim 8, further comprising executable instructions causing the processor to:

enable page fault handling by the virtual machine responsive to determining that no page fault has been triggered by the write operation.

11. The computer-readable non-transitory storage medium of claim 8, further comprising executable instructions causing the processor to:

responsive to determining that the active memory context associated with the processor does not match the memory context of the virtual machine, queue the data frame for processing by the I/O processing thread.

12. The method of claim 1, further comprising:

notifying the virtual machine of the data frame.

13. The method of claim 1, wherein the active memory context associated with the processor comprises a page table utilized for translating virtual addresses to physical addresses.

14. The method of claim 1, wherein identifying the virtual machine comprises identifying a network interface card identified by a Media Access Control (MAC) address of the data frame.

15. The method of claim 1, wherein writing the data frame into a memory of the virtual machine is performed by the interrupt handling routine.

16. The method of claim 1, further comprising:

responsive to determining that the active memory context associated with the processor matches the memory context of the virtual machine, disabling page fault handling by the virtual machine thus causing the host computer system to handle page faults.

17. The method of claim 1, further comprising:

responsive to determining that no page fault has been triggered by writing the data frame into the memory of the virtual machine, injecting an interrupt into a virtual processor associated with the virtual machine to notify the virtual machine of the data frame.

18. The computer-readable non-transitory storage medium of claim 8, further comprising executable instructions to cause the processor to:

responsive to determining that the active memory context associated with the processor matches the memory context of the virtual machine, disable page fault handling by the virtual machine.

19. The computer-readable non-transitory storage medium of claim 8, further comprising executable instructions to cause the processor to:

inject an interrupt into a virtual processor associated with the virtual machine to notify the virtual machine of the data frame.

20. The computer-readable non-transitory storage medium of claim 8, wherein the active memory context comprises a page table utilized for translating virtual addresses to physical addresses.

* * * * *